A. G. GIRARD.
PUMP SUPPORT.
APPLICATION FILED NOV. 4, 1918.
1,338,621. Patented Apr. 27, 1920.
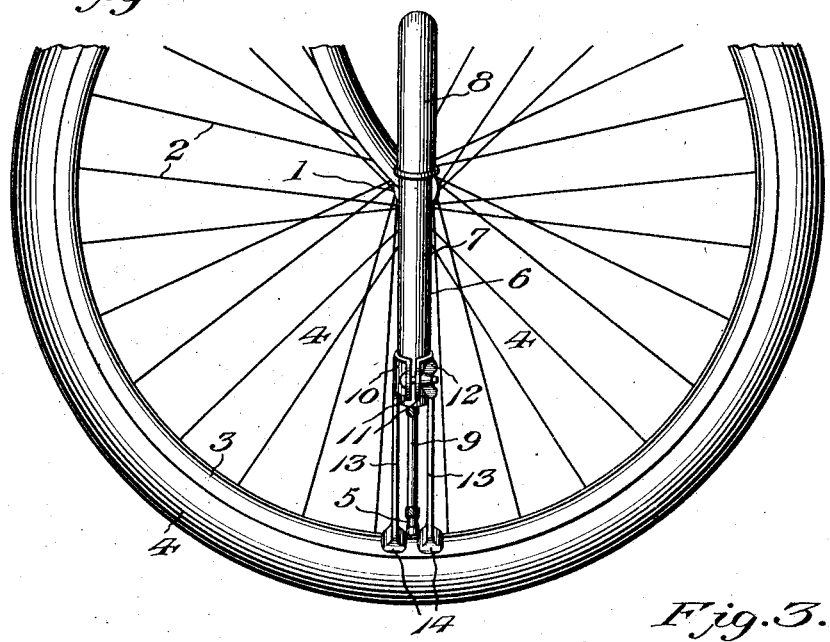
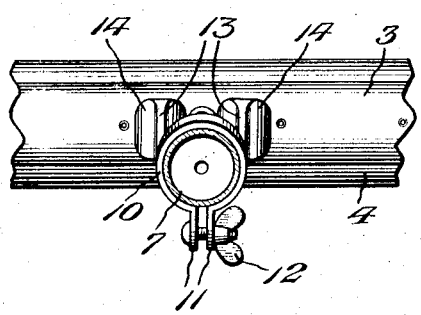
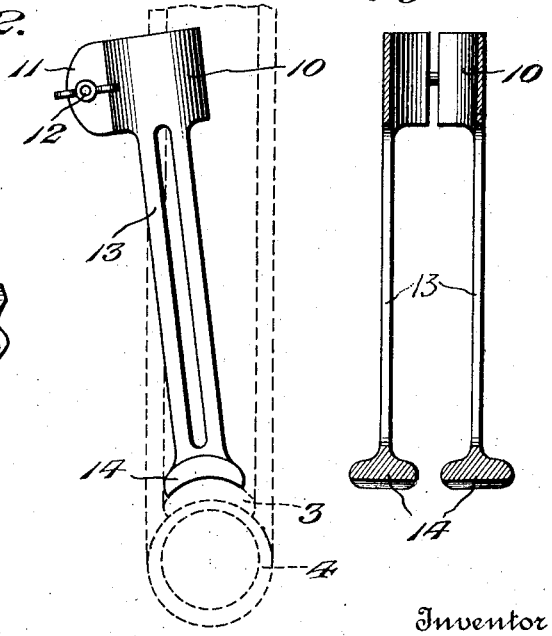
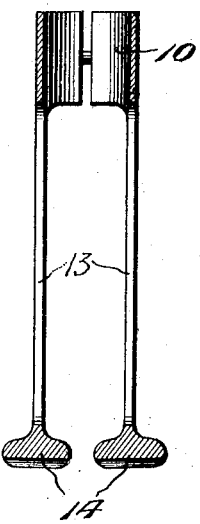
Inventor
Adolph G. Girard
Witnesses
Edwin F. McKee
By Victor J. Evans
Attorney

UNITED STATES PATENT OFFICE.

ADOLPH G. GIRARD, OF SAN FRANCISCO, CALIFORNIA.

PUMP-SUPPORT.

1,338,621. Specification of Letters Patent. Patented Apr. 27, 1920.

Application filed November 4, 1918. Serial No. 261,065.

*To all whom it may concern:*

Be it known that I, ADOLPH G. GIRARD, a citizen of the United States, residing at San Francisco, in the county of San Francisco and State of California, have invented new and useful Improvements in Pump-Supports, of which the following is a specification.

This invention relates to a novel device for supporting tire pumps and the invention is more particularly adapted for bicycle pumps.

The primary object of the invention is to provide means for holding the pump firmly in a certain relation to the rim so as to prevent kinks and twists in the hose connecting the pump to the valve stem.

Another object of the invention is to provide a device having means for clamping a part of the pump and having legs thereon for engaging the rim.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of part of a bicycle wheel with my invention in place thereon;

Fig. 2 is a side view of the device itself;

Fig. 3 is a cross section;

Fig. 4 is an enlarged section on the line 4—4 of Fig. 1.

In these views 1 indicates the hub of the wheel, 2 the spokes thereof, 3 the rim and 4 the tire. 5 indicates the valve stem. 6 indicates the usual type of bicycle pump which consists of the main part 7 and the movable part 8. 9 is the hose connection carried by the lower part of the pump and adapted to engage with the valve stem when the tire is to be inflated. As before stated my improved device is intended to firmly support the pump on the rim while the tire is being inflated. The device comprises a body part 10 made in the form of a split ring with its ends extended outwardly to form apertured ears connected by a bolt having a wing nut 12. 13 indicates a pair of arms projecting from the lower edge of the ring, at diametrically opposite points thereof and said arms have curved enlargements 14 at the free ends.

In using the device the lower end of the pump is placed in the ring and clamped therein by tightening the wing nut. Before the nut is tightened, however, the nipple on the end of the hose is connected with the valve stem by rotating the pump in the ring so as to screw the nipple to said stem. The enlargements 14 will engage the rim on each side of the valve stem and thus firmly support the pump in position. In this way the pump can be easily operated and there is no danger of the hose becoming twisted or pulled from the valve stem.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having described the invention, what is claimed is:

A support for hand pumps including a split ring having its end portions extended outwardly in spaced parallel relation and apertured for forming ears, a bolt extending through the apertures of said ears and adapted for securing the ring to a hand pump, and a pair of spaced parallel arms extending forwardly from said split ring and having their forward portions formed with enlargements adapted for engaging a wheel rim on opposite sides of the valve of the wheel, said enlargements being curved to conform to the curvature of said rim.

In testimony whereof I affix my signature.

ADOLPH G. GIRARD.